(12) United States Patent
Gilbert

(10) Patent No.: US 12,365,170 B2
(45) Date of Patent: Jul. 22, 2025

(54) PACKAGING LAMINATE

(71) Applicant: BMSI, Inc., Monroe, GA (US)

(72) Inventor: Lee Phillips Gilbert, Athens, GA (US)

(73) Assignee: BMSI, Inc., Monroe, GA (US)

( * ) Notice: Subject to any disclaimer, the term of this patent is extended or adjusted under 35 U.S.C. 154(b) by 11 days.

(21) Appl. No.: 17/589,139

(22) Filed: Jan. 31, 2022

(65) Prior Publication Data

US 2022/0153001 A1 May 19, 2022

Related U.S. Application Data

(63) Continuation of application No. 15/442,098, filed on Feb. 24, 2017, now Pat. No. 11,235,561.

(Continued)

(51) Int. Cl.
*B32B 27/08* (2006.01)
*B32B 27/18* (2006.01)
(Continued)

(52) U.S. Cl.
CPC .............. *B32B 27/08* (2013.01); *B32B 27/18* (2013.01); *B32B 27/205* (2013.01); *B32B 27/306* (2013.01); *B32B 27/308* (2013.01); *B32B 27/32* (2013.01); *B32B 27/327* (2013.01); *B32B 2250/02* (2013.01); *B32B 2250/03* (2013.01); *B32B 2250/242* (2013.01);
(Continued)

(58) Field of Classification Search
CPC ....... B32B 27/08; B32B 27/18; B32B 27/205; B32B 27/306; B32B 27/308; B32B 27/32; B32B 27/327; B32B 2250/02; B32B 2250/03; B32B 2250/242; B32B 2250/246; B32B 2270/00; B32B 2307/514; B32B 2307/54; B32B 2307/5825; B32B 2307/7244; B32B 2307/7246; B32B 2307/732; B32B 2439/70

See application file for complete search history.

(56) References Cited

U.S. PATENT DOCUMENTS

| | | |
|---|---|---|
| 3,333,024 A | 7/1967 | Haefele et al. |
| 4,752,597 A | 6/1988 | Turner |

(Continued)

FOREIGN PATENT DOCUMENTS

| | | |
|---|---|---|
| CN | 204801185 | 11/2015 |
| EP | 1 323 520 | 7/2003 |

(Continued)

OTHER PUBLICATIONS

Saimos et al. Compatibilization of poly(ethylene-co-vinyl alcohol) (EVOH) and EVOH/HDPE blends with ionomers. Structure and Properties. Polymer vol. 39 No. 16 pp. 3863-3870 1998 (Year: 1998).*

(Continued)

*Primary Examiner* — Alicia J Weydemeyer
*Assistant Examiner* — Laura B Figg
(74) *Attorney, Agent, or Firm* — Bradley Arant Boult Cummings LLP

(57) ABSTRACT

Disclosed herein are compositions and methods related to a packaging laminate comprising: a first polymeric layer comprising a polypropylene copolymer; and a second polymeric layer comprising a high density polyethylene (HDPE) resin with a coextruded ethyl vinyl alcohol (EVOH) compatibilizer.

12 Claims, 4 Drawing Sheets

Related U.S. Application Data

(60) Provisional application No. 62/322,886, filed on Apr. 15, 2016, provisional application No. 62/299,235, filed on Feb. 24, 2016.

(51) Int. Cl.
 *B32B 27/20* (2006.01)
 *B32B 27/30* (2006.01)
 *B32B 27/32* (2006.01)

(52) U.S. Cl.
 CPC ..... *B32B 2250/246* (2013.01); *B32B 2270/00* (2013.01); *B32B 2307/514* (2013.01); *B32B 2307/54* (2013.01); *B32B 2307/5825* (2013.01); *B32B 2307/7244* (2013.01); *B32B 2307/7246* (2013.01); *B32B 2307/732* (2013.01); *B32B 2439/70* (2013.01)

(56) References Cited

U.S. PATENT DOCUMENTS

| | | | |
|---|---|---|---|
| 5,026,610 | A | 6/1991 | Harrison |
| 5,084,352 | A * | 1/1992 | Percec ............... B32B 27/306 428/476.3 |
| 5,352,744 | A | 10/1994 | Bates et al. |
| 5,612,422 | A | 3/1997 | Hucul et al. |
| 5,645,253 | A | 7/1997 | Hoshino |
| 2004/0106719 | A1 | 6/2004 | Kim |
| 2004/0166298 | A1 | 8/2004 | Chapman et al. |
| 2004/0206055 | A1 * | 10/2004 | Schroeder ............ B65B 9/093 53/562 |
| 2006/0040121 | A1 * | 2/2006 | Poloso ............... B32B 27/32 428/516 |
| 2007/0026250 | A1 * | 2/2007 | Hofmeister ......... B32B 37/06 428/474.4 |
| 2007/0148484 | A1 | 6/2007 | Baer |
| 2008/0178768 | A1 | 7/2008 | Breese |
| 2008/0310770 | A1 * | 12/2008 | Turvey ............ B65D 81/2023 383/42 |
| 2009/0052813 | A1 | 2/2009 | Grosse-Heitmeyer et al. |
| 2010/0047599 | A1 | 2/2010 | Kvamme |
| 2010/0151218 | A1 | 6/2010 | Curie |
| 2012/0107466 | A1 | 5/2012 | Siegel |

FOREIGN PATENT DOCUMENTS

| | | | |
|---|---|---|---|
| EP | 2 123 452 | 11/2009 | |
| KR | 100521594 | 10/2005 | |
| MX | 9801669 | 6/1998 | |
| WO | WO-2014088827 A1 * | 6/2014 | ............ C08J 5/18 |

OTHER PUBLICATIONS

"Enhancing the Value of Barrier Film Recycle Streams with Dow's Compatibilizer Technology" (Year: 2014).*

Hussain et al. "Effect of selected residual Ziegler-Natta and metallocene catalysts on the UV-induced degradation of unstabilized ethylene homopolymer films" Elsevier, Polymer Degradation and Stability vol. 95 issue 12 pp. 2289-2299 (Year: 2010).*

Samios et al., "Compatibilization of poly(ethylene-co-vinyl alcohol) (EVOH) and EVOH/HDPE blends with ionomers, Structure and Properties" Elsevier, Polymer vol. 39, No. 16, 1998, pp. 3863-3870.

Dow, "Enhancing the Value of Barrier Film Recycle Streams with Dow's Compatibilizer Technology", vol. 18, Issue 2, Oct. 2014.

Kalfoglou and Samios et al., "Compatibilization of poly(ethylene-co-vinyl alcohol) (EVOH) and EVOH/HDPE blends with jonomers, Structure and Properties" Elsevier, Polymer, vol. 39, No. 16, 1998, pp. 589-596.

Hussain et al., "Effect of selected residual Ziegler-Natta and metallocene catalysts on the UV-induced degradation of unstabilized ethylene homopolymer films", Elsevier, Polymer Degradation and Stability, vol. 95, issue 12, 2010, pp. 2289-2299.

Zhang, et al., "The structure-property relationships of LLDPE-EVOH blend films fabricated by multiplication extrusion", Elsevier Polymer, 57 (2015), pp. 117-124.

* cited by examiner

PACKAGING LAMINATE

This application claims the benefit of U.S. Provisional Application No. 62/299,235, filed on Feb. 24, 2016 and U.S. Provisional Application No. 62/322,886, filed on Apr. 15, 2016, applications which are incorporated herein by reference in their entirety.

FIELD OF THE INVENTION

This invention relates to food packaging materials and more particularly to a recyclable flexible packaging laminate.

BACKGROUND OF THE INVENTION

Coffee and other food products are packaged in bags formed from plastic wrap. Such plastic wrap must meet certain USDA and FDA standards. In addition, in order to protecting food products from contamination and extending the shelf life of the food products, the plastic wrap must be durable, printable, and capable of running on packaging machines. Finally, the plastic wrap should be recyclable once it has been discarded.

Accordingly, a need exists for a plastic wrap material that meets all the criteria outlined above.

SUMMARY OF THE INVENTION

In one aspect, disclosed herein are packaging laminates comprising a first polymeric layer comprising a polypropylene copolymer; and a second polymeric layer comprising a low density polyethylene (LDPE), linear low density polyethylene (LLDPE), and/or high density polyethylene (HDPE) resin with a coextruded ethyl vinyl alcohol (EVOH) compatibilizer.

Disclosed herein are packaging laminates of any proceeding aspect, further comprising a third polymeric layer positioned between the first layer and the second layer, wherein the third polymeric layer comprises an HDPE resin.

In one aspect disclosed herein are packaging laminates comprising a first polymeric layer comprising a high density polyethylene (HDPE) resin; and a second polymeric layer comprising a low density polyethylene (LDPE), linear low density polyethylene (LLDPE), and/or high density polyethylene (HDPE) resin with a coextruded ethyl vinyl alcohol (EVOH) film barrier.

Also disclosed are packing laminates of any proceeding aspect, further comprising a third layer positioned between the first layer and the second layer, wherein the third polymeric layer comprises an HDPE resin.

The foregoing and other features and advantages of the invention will be apparent to those of ordinary skill in the art from the following more particular description of the invention and the accompanying drawing.

DETAILED DESCRIPTION OF EMBODIMENTS OF THE INVENTION

Figure 1:
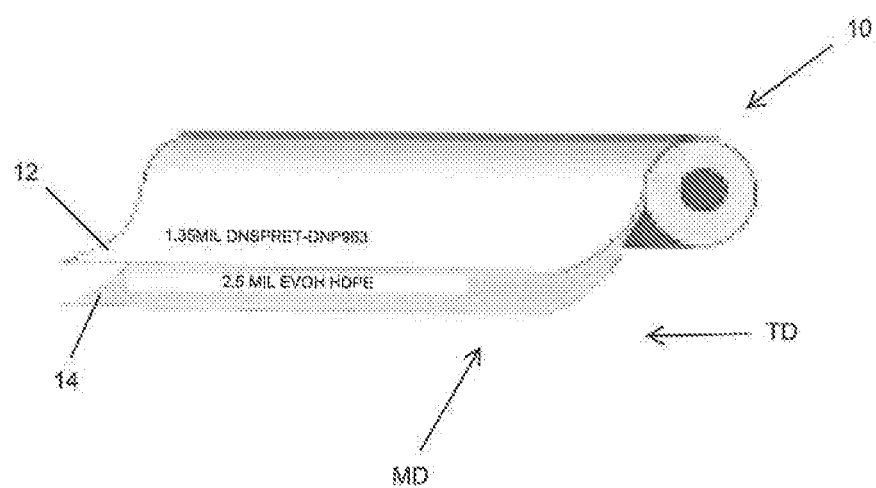
FIG. 1 is a perspective drawing of a first embodiment of a packaging laminate in accordance with the present invention.

The present invention is a packaging laminate that meets the criteria for a plastic wrap for food products. In one aspect, the packaging laminate comprises two or more layers of a polyolefin film. It is understood and herein contemplated that the polymeric layers comprise, amongst other things one or more polymeric resins. Resins suitable for the present invention are polyolefins which may include low density polyethylene (LDPE), linear low density polyethylene (LLDPE), high density polyethylene (HDPE), medium density polyethylene (HDPE), low density polyethylene/high density polyethylene (LD/HDPE) mixes, ultra high molecular weight polyethylene(UHMWPE), cross-linked polyethylene (XLPE), polypropylene (PP) polymers, metallocene catalyzed polyolefin (i.e. plastomer) resins. The resins of the present invention may either be homopolymers, co-polymers and/or ter-polymers of any one or more of the above polymers. Examples of the latter are olefin-copolymers such as polyethylene butylacrylate, polyethylene methacrylate, polypropylene-ethylene copolymers, and polyethylene vinyl acetate, and ter polymers of polypropylene-ethylene co-polymer, LDPE, and HDPE.

Because the disclosed film comprises multiple polymeric layers, it is understood, that that the polymeric composition of each layer can contribute to the physical attributes of the film given the intended use of the film. Accordingly, the composition of each layer of the multilayered polymeric film can be different or the same as any one or more additional layers. In one aspect, each layer of the multilayered polymeric film can comprise different polyolefin resins. For example, one polymeric layer can comprise one or more polypropylene, polypropylene co-polymers, LDPE, HDPE, and/or LDPE/HDPE co-polymer resins and the second polymeric layer can comprise one or more HDPE, LLDPE, LDPE and/or LD/HDPE copolymer resins. Accordingly, in one aspect, disclosed herein are packaging laminates comprising a first polymeric layer comprising a polypropylene copolymer (such as, for example a polypropylene-ethylene or polypropylene-ethylene and LDPE, HDPE and/or LD/HDPE co-polymers); and a second polymeric layer comprising a high density polyethylene (HDPE), linear low density polyethylene (LLDPE), or low density (LDPE), and/or LD/HDPE co-polymer resin. Also disclosed are packaging laminates comprising a first polymeric layer comprising a high density polyethylene (HDPE) resin; and a second polymeric layer comprising a a high density polyethylene (HDPE), linear low density polyethylene (LLDPE), or low density (LDPE), and/or LD/HDPE co-polymer resin. The resins employed in the disclosed packaging laminates can be virgin resins or from reclaimed or recycled sources.

It is understood and herein contemplated that there can be more than one component or polymer in the first and second polymeric layers. In one aspect, the polymer comprising the greatest percentage weight of the polymeric layer (i.e., the primary polymer) can be at least 1, 2, 3, 4, 5, 6, 7, 8, 9, 10, 15, 16, 16.8, 17, 20, 25, 30, 33, 35, 40, 45, 50, 55, 58.3, 60, 65, 66, 66.6, 70, 75, 80, 85, 90, 91, 92, 93, 94, 95, 96, 97, 98, 99, or 100 percentage weight (or any amount in between) of the first and/or second polymeric layer. For example, disclosed herein are packaging laminates wherein the first polymeric layer comprises a polypropylene co-polymer (for example, a polypropylene-ethylene co-polymer), wherein the polypropylene copolymer comprises between 35% and 55% weight, more preferably between 40% and 50% weight, and more preferably 45% weight of the first polymeric layer. In another embodiment, for example, the first polymeric layer comprises HDPE, wherein the HDPE comprises between 40% and 100% weight (i.e., 40, 45, 50, 55, 60, 65, 70, 75, 80, 85, 90, 91, 92, 93, 94, 95, 96, 97, 98, 99, or 100% weight), more preferably between 60% and 100% weight, most preferably between 75% and 100% weight of the first polymeric layer In one aspect, the HDPE can be 80% weight of the first polymeric layer (for example a first polymeric layer comprising 80% weight HDPE and 20% weight Octene). Also, by way of example, disclosed herein are packaging laminates wherein the second polymeric layer comprises HDPE at 66.6% weight of the second polymeric layer. In a further embodiment, disclosed herein are packaging laminates wherein the second polymeric layer comprises HDPE at 58.3% weight of the second polymeric layer. Thus, for example disclosed herein are packaging laminates comprising a polypropylene co-polymer first polymeric layer and a second polymeric layer comprising HDPE at between 50 and 70% weight (such as, for example 58.3% or 66.6%) of the second polymeric layer. Also, disclosed herein are, for example, packaging laminates comprising a HDPE first polymeric layer and a second polymeric layer comprising HDPE at between 50 and 70% weight (such as, for example 58.3% or 66.6%) of the second polymeric layer.

As noted above, the disclosed polymeric layers can comprise additional secondary components including polymers in addition to the primary polymer, including, but not limited to additionally one or more of Octene, LLDPE, LDPE, HDPE, LD/HDPE polymers, catalysts (for example, metallocene), antiblock components, plastomers, ionomers (such as, for example SURLYN®), tie, slip components, ethyl vinyl alcohol (EVOH), and EVOH compatibilizers (such as, for example Dow RETAIN® EVOH Compatibilizer). Accordingly, in one aspect, disclosed herein are packaging laminates wherein the first polymeric layer further comprises a LLDPE, LDPE, HDPE, and/or LD/HDPE co-polymer resin. It is understood and herein contemplated that the secondary components can each individually comprise any percentage weight less than the primary polymer including, but not limited to 0.2, 0.22, 0.3, 0.4, 0.5, 0.55, 0.6, 0.7, 0.8, 0.9, 1, 1.1, 1.2, 1.3, 1.4, 1.5, 1.6, 1.7, 1.8, 1.9, 2, 3, 4, 5, 5.9, 6, 6.5, 7, 8, 9, 10, 10.23, 11, 11.8, 12, 12.2, 13, 14, 15, 16, 16.8, 17, 18, 19, 20, 25, 30, 30.2, 33, 35, 40, 45 percent weight. In one aspect, the first polymeric layer can comprise HDPE resin of 16.8 percent weight and LDPE resin of 6 percent weight of the total weight of the first polymeric layer (for example, a first polymeric layer comprising a polypropylene co-polymer (such as 45% polypropylene co-polymer) and 16.8% weight HDPE and 6% weight LDPE). In another embodiment, the first polymeric layer can comprise 80% weight HDPE and 20% weight Octene. Also contemplated herein are polymeric layers comprising between 8% and 20% weight, more preferably between 10% and 14% weight, most preferably between 12% and 13% plastmoner (for example a polymeric layer (such as a second polymeric layer comprising 12.2% weight plastomer). Also contemplated herein are polymeric layers comprising between 8% and 20% weight, more preferably between 10% and 14% weight, most preferably between 10% and 12% ionomer such as SURLYN® (for example a polymeric layer (such as a second polymeric layer comprising 10.23% weight ionomer).

As previously noted, the polymeric layers can comprise additives such as antioxidants (for example, hindered phenols such as, for example, IRGANOX® 1010), phosphites (for example, IRGAFOS® 168)), U.V. stabilizers, cling additives (for example, polyisobutylene), antiblock additives, slip agents, colorants, pigments, fillers, fire retardants, light and heat stabilizers, and extension oils can also be included in the compositions of the present invention, to the extent that they do not interfere with the enhanced properties discovered by applicants. In-process additives, for example, calcium stearate, water, and fluoropolymers may also be used for purposes such as for the deactivation of residual catalyst or for further improved processability.

Optionally, compatibilizers such as a low molecular weight plastomer may also be used in the composition of the present invention. A compatibilizer typically contains a functional group which is compatible with the primary polymer of the second polymeric layer such as, for example, HDPE. Compatibilizers are well-known in the art and one skilled in the art would easily be able to recognize the type of compatibilizer suitable for the desired compositions, if needed. For example, a blend of a hydrogenated rigid block copolymer with a styrene-butadiene-styrene block copolymer or other styrenic polymer may additionally comprise a styrene-ethylenebutene-styrene block copolymer as a compatibilizer. Additionally, a blend of a hydrogenated rigid block copolymer with a polycarbonate may additionally comprise a polyamide-maleic anhydride grafted polyethylene as a compatibilizer. In one aspect, the compatibilizer can be an ethyl vinyl alcohol (EVOH) compatibilizer, such as, for example Dow RETAIN® EVOH Compatibilizer. Thus, in one aspect, disclosed herein are packaging laminates comprising a first polymeric layer comprising a polypropylene copolymer; and a second polymeric layer comprising a Low Density Polyethylene (LDPE), Linear low density polyethylene (LLDPE), and/or high density polyethylene (HDPE) resin with a coextruded ethyl vinyl alcohol (EVOH) compatibilizer. It is contemplated herein that the compatibilizer can comprise between 2 and 15 percentage weight of the polymeric later (for example 2, 3, 4, 5, 6, 7, 8, 9, 10, 11, 12, 13, 14, or 15 percent weight), more preferably between 5 and 10 percent weight. Accordingly, disclosed herein are packaging laminates wherein the second polymeric layer comprises a compatibilizer (such as, for example, Dow RETAIN® EVOH compatibilizer), and wherein the compatibilizer comprises at least about 5% weight of the second polymeric layer.

In one aspect, the compatibilizer is loaded with in a 1:1 ration with a barrier such as, for example, an EVOH barrier. In one aspect, disclosed herein are packaging laminates comprising packaging laminates comprising a first polymeric layer comprising a polypropylene copolymer; and a second polymeric layer comprising a Low Density Polyethylene (LDPE), Linear low density polyethylene (LLDPE), and/or high density polyethylene (HDPE) resin resin with a coextruded ethyl vinyl alcohol (EVOH) compatibilizer and an EVOH barrier. Also disclosed herein are packaging laminates comprising a first polymeric layer comprising a high density polyethylene (HDPE) film; and a second polymeric layer comprising Low Density Polyethylene (LDPE), Linear low density polyethylene (LLDPE), and/or high density polyethylene (HDPE) resin (for example, a low density/high density polyethylene (LD/HDPE) film) with a coextruded ethyl vinyl alcohol (EVOH) film barrier. Accordingly, disclosed herein are packaging laminates comprising between 2 and 15 percentage weight of the polymeric later (for example 2, 3, 4, 5, 6, 7, 8, 9, 10, 11, 12, 13, 14, or 15 percent weight), more preferably between 5 and 10 percent weight. For example, in one aspect, the packaging laminates can comprise a compatibilizer (such as, for example, Dow RETAIN® EVOH Compatibilizer) and a barrier (for example, an EVOH barrier) wherein the compatibilizer and the barrier are each 5% total weight of the second polymeric layer.

In one aspect, the disclosed polymeric layers of the packaging laminates can comprise a catalyst (such as, for example Metallocene). Typically, copolymers are hydrogenated to remove sites of unsaturation. Any method of hydrogenation can be used and such methods typically include the use of metal catalysts supported on an inorganic substrate, such as Pd on BaSO4 (U.S. Pat. No. 5,352,744) and Ni on kieselguhr (U.S. Pat. No. 3,333,024). Additionally, soluble, homogeneous catalysts such as single-site catalyst systems known in the art such Ziegler vanadium, hafnium and zirconium catalyst systems and metallocene catalyst systems for example, a constrained geometry catalyst systems or those prepared from combinations of transition metal salts of 2-ethylhexanoic acid and alkyl lithiums can be used. The copolymer hydrogenation can also be achieved using hydrogen and a heterogeneous catalyst such as those described in U.S. Pat. Nos. 5,352,744, 5,612,422 and 5,645,253. The catalysts described therein are heterogeneous catalysts consisting of a metal crystallite supported on a porous silica substrate.

Alternatively, the hydrogenation can be conducted in the presence of a mixed hydrogenation catalyst characterized in that it comprises a mixture of at least two components. The first component comprises any metal which will increase the rate of hydrogenation and includes nickel, cobalt, rhodium, ruthenium, palladium, platinum, other Group VIII metals, or combinations thereof. The second component used in the mixed hydrogenation catalyst comprises a promoter which inhibits deactivation of the Group VIII metal(s) upon exposure to polar materials, and is herein referred to as the deactivation resistant component. Such components preferably comprise rhenium, molybdenum, tungsten, tantalum or niobium or mixtures thereof.

The amount of catalyst (such as, for example, Metallocene) can be between 0.2 and 40 percent weight of the polymeric layer of the packaging laminate, preferably between 5 and 33 percent weight. For example, the catalyst (such as, for example, Metallocene) can comprise 0.2, 0.3, 0.4, 0.5, 0.6, 0.7, 0.8, 0.9, 1, 2, 3, 4, 5, 5.9, 6, 7, 8, 9, 10, 11, 11.8, 12, 13, 14, 15, 16, 17, 18, 19, 20, 21, 22, 23, 24, 25, 26, 27, 28, 29, 30, 30.2, 31, 32, 33, 34, 35, 36, 37, 38, 39, or 40 percent weight of a polymeric layer. It is understood and herein contemplated that the percent weight of catalyst for each polymeric layer is independent of the other layer(s). For example, the catalyst (such as, for example Metallocene) can comprise 30.2 percent weight of the first polymeric layer and 5.9 percent weight of the second polymeric layer.

In one particular embodiment, the packaging laminate can comprise a first polymeric layer comprising a polypropylene co-polymer and a second polymeric layer comprising an HDPE, LDPE, and/or LLDPE resin co-extruded with an EVOH barrier and an EVOH compatibilizer (such as Dow RETAIN® EVOH compatibilizer) as set forth in Table 1 below.

TABLE 1

| Resin % | Total in DNSPRET-DNP963-T4 |
|---|---|
| Copolymer Polypropylene (3.8% Ethylene) | 45 |
| Metallocene | 30.2 |
| High Density Polyethylene | 16.8 |
| Low Density Polyethylene | 6 |
| Slip | 1.2 |
| Antiblock | 0.8 |

| Resin | % Total in EVOH-ION-DOW |
|---|---|
| High Density Polyethylene | 58.3 |
| Plastomer | 122 |
| Tie | 6.5 |
| Metallocene | 11.8 |
| EVOH | 5 |
| Dow RETAIN® EVOH Compatibilizer | 5 |
| Antiblock | 0.4 |
| Slip | 0.8 |

It is understood and herein contemplated that adjusting the percentage weight of individual components or changing components (such as exchanging a plastomer for an ionomer) of either or both polymeric layers of the packaging laminate can change the packaging characteristics such as, for example, allowing for the ability to create a seam in a packaging container made of the packaging laminate at low heat or can be separated without tearing the polymeric layer. Additionally, such changes can change production speed, reduce pressure needed for recycling, reduce leaks, or increase puncture resistance. For example the use of an ionomer such as SURLYN® in the second polymeric layer to allow for separation of a seam without tearing the packaging laminate. Thus, for example, in one aspect, the packaging laminate can comprise a first polymeric layer comprising a polypropylene co-polymer and a second polymeric layer comprising an HDPE, LDPE, and/or LLDPE resin co-extruded with an EVOH barrier and an EVOH compatibilizer (such as Dow RETAIN® EVOH compatibilizer) as set forth in Table 2 below.

TABLE 2

| Resin | % Total in DNSPRET-DNP963-T4 |
|---|---|
| Copolymer Polypropylene(3.8% Ethylene) | 45 |
| Metallocene | 30.2 |
| High Density Polyethylene | 16.8 |
| Low Density Polyethylene | 6 |
| Slip | 1.2 |
| Antiblock | 0.8 |

| Resin | % Total in EVOH-ION-DOW |
|---|---|
| High Density Polyethylene | 66.6 |
| SURLYN® | 10.23 |
| Tie | 6.5 |
| Metallocene | 5.9 |
| EVOH | 5 |
| Dow RETAIN® EVOH Compatibilizer | 5 |
| Antiblock | 0.55 |
| Slip | 0.22 |

It is understood and herein contemplated that there are structural and functional benefits to the orientation of the polymeric layers in the packaging laminate. For example, in one aspect, disclosed herein are packaging laminates comprises a first polymeric layer and a second polymeric layer, wherein the first polymeric layer is oriented to be on the outside layer of the packaging laminate. For example, packaging laminates comprising a first polymeric layer comprising a polypropylene co-polymer (such as a polypropylene and 3.5% ethylene co-polymer) and a second polymeric layer comprising HDPE, LLDPE, LDPE, and/or and LD/HDPE co-polymer; a first polymeric layer comprising a polypropylene co-polymer (such as a polypropylene and 3.5% ethylene co-polymer) as well as LDPE and/or HDPE and a second polymeric layer comprising HDPE, LLDPE, LDPE, and/or and LD/HDPE co-polymer; a first polymeric layer comprising a HDPE or HDPE and Octene and a second polymeric layer comprising HDPE, LLDPE, LDPE, and/or and LD/HDPE co-polymer; wherein the first polymeric layer is on the outside of the packaging laminate. In another aspect, disclosed herein are packaging laminates wherein the first polymeric layer is oriented to be on the inside layer of the packaging laminate.

While in its simplest form the multilayered polymeric films disclosed herein comprises two layers. However, it is fully contemplated herein that the multilayered polymeric film can comprise 1, 2, 3, 4, 5, 6, 7, 8, 9, 10, 11, 12, 13, 14, 15, 16, 17, 18, 29, 20, 25, 30, 35, 40, 45, or 50 or more additional polymer layers. Thus, in one aspect, disclosed herein are multilayered polymeric films comprising 2, 3, 4, 5, 6, 7, 8, 9, or 10 or more layers. For example, disclosed herein are multilayered polymeric films further comprising a third polymeric layer adjacent to the second layer and on the opposite side from the first layer. In one aspect, disclosed herein are packaging laminates, further comprising a third polymeric layer positioned between the first layer and the second layer, wherein the third polymeric layer comprises an HDPE, LDPE, and/or LLDPE resin. For example, disclosed herein are packaging laminates comprising a first polymeric layer comprising a polypropylene copolymer; and a second polymeric layer comprising a high density polyethylene (HDPE) resin (including, but not limited to an HDPE resin with a coextruded ethyl vinyl alcohol (EVOH) compatibilizer and/or an EVOH barrier), further comprising a third polymeric layer positions between the first and second polymeric layer, wherein the third polymeric layer comprises HDPE, LDPE, and/or LLDPE. Additionally, disclosed herein are packaging laminates comprising a first polymeric layer comprising a high density polyethylene (HDPE) resin and a second polymeric layer comprising a low density/high density polyethylene (LD/HDPE) resin (including a LD/HDPE resin that is coextruded ethyl vinyl alcohol compatibilizer (such as, for example Dow RETAIN® EVOH compatibilizer and/or an EVOH film barrier) further comprising a third polymeric layer positions between the first and second polymeric layer, wherein the third polymeric layer comprises HDPE, LDPE, and/or LLDPE.

It is understood and herein contemplated that the individual polymeric layers can comprise the same or different portion of the multilayered polymeric film and that the ratio of individual layers can be modified to achieve different visual effects. For example each layer of a two layered film can comprise 50% of the film. Alternatively, one polymeric layer of a two layered polymeric film can comprise 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 33.33, 34, 35, 35.065, 36, 37, 38, 39, 40, 41, 42, 43, 44, 45, 46, 47, 48, 49, 50, 51, 52, 53, 54, 55, 56, 57, 58, 59, 60, 61, 62, 63, 64, 64.935, 65, 66, 66.66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 percent of the multilayered film while the remaining layer comprises the remaining percentage of the multilayered film. For example, disclosed herein are packaging laminates wherein the first polymeric layer comprises about 35% of the thickness of the laminate (for example, a packaging laminate with a 1.35 MIL first polymeric layer and a 2.5 MIL second polymeric layer). In another aspect, the thickness polymeric layer of the packaging laminate can comprise about 20% of the thickness of the packaging laminate (for example a packaging laminate with a 0.8 MIL first layer and a 4.0 MIL second layer).

Similarly, in a three layered film each layer can comprise the same portion (i.e., a ⅓ portion) of the film structure, have two layers comprising the same portion of the film structure and the third layer being a different portion, or be independently proportioned. For example, it is disclosed herein that the first (i.e., the outer) layer and the third layer (middle layer) can each comprise 20% of the multilayered film (a total of 40%) while the second (outside layer) comprises the remaining 60% of the film. That is, any combination of layer ratios can exist in the multilayered film, including, but not limited to, an outer:middle:inner percentage of 5:90:5; 10:80:10; 15:70:15; 20:60:20; 25:50:25; 30:40:30; 35:30:35; 40:20:40; 45:10:45; 5:5:90; 10:10:80; 15:15:70; 20:20:60; 25:25:50; 30:30:40; 35:35:30; 40:40:20; 45:45:10; 90:5:5; 80:10:10; 70:15:15; 60:20:20; 50:25:25; 40:30:30; 30:35:35; 20:40:40; 10:45:45; 5:10:85; 10:15:75; 15:20:65; 20:25:55; 25:30:45; 10:5:85; 15:10:75; 20:15:65; 25:20:55; 30:25:45; 85:10:5; 75:15:10; 65:20:15; 55:25:20; 45:30:25; 85:5:10; 75:10:15; 65:15:20; 55:20:25; 45:25:30; 5:85:10; 10:75:15; 15:65:20; 20:55:25; 25:45:30; 10:85:5; 15:75:10; 20:65:15; 25:55:20; or 30:45:25 or any other combination (such as, for example, 42.1:31.6:26.3).

Typically the thickness of each polymeric layer of the packaging laminate is referenced in terms of MILs or gauge (GA, wherein 10 GA=0.1 MIL). In one aspect, the thickness of each polymeric layer can independently be from about 0.4 to 6.0 MILs. That is each polymeric layer can be 0.4, 0.5, 0.6, 0.7, 0.8, 0.9, 1.0, 1.1, 1.2, 1.25, 1.3, 1.35, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, or 6.0 MIL. For example, the first polymeric layer can be between 0.4 and 2.5 MILs (for example 0.8 MIL or 1.35 MIL) and the second polymeric layer can be between 1.25 and 6.0 MILs (for example 2.5 MIL or 4.0 MIL). In one aspect the first polymeric layer can be 1.35 MIL and the second polymeric layer can be 2.5 MIL. In another aspect the first polymeric layer can be 0.8 MIL and the second polymeric layer can be 4.0 MIL. In aspect comprising a further third polymeric layer (i.e., a middle layer) the thickness of the third polymeric layer can be, for example, between 0.8 and 4.5 MILs. Accordingly, also disclosed herein a trilaminate packaging laminates wherein the first polymeric layer is 1.25 MIL, the second polymeric layer is 2.0 MIL and the third (i.e., the middle) polymeric layer is 1.5 MIL.

The packaging laminates disclosed herein are in one aspect, intended for use in packaging containers for perishable produces such as, for example, coffee beans or ground coffee. In one aspect, it is contemplated herein are packaging containers comprising the packaging laminates disclosed herein further comprising a valve for dispensing a product into and/or out of the packaging container. In one aspect the valve can be configured to allow for degassing (such as, for example comprising a degassing filter).

To address the additional stress that could be placed on the valve, it is understood and herein contemplated that the thickness of the polymeric layers of the valve can be greater than the thickness of the polymeric layers of the packaging laminate.

In one aspect, the packaging laminate of the present invention can be recyclable to the same extent that #2 HDPE film or #4 linear low density polyethylene (LLDPE) film is recyclable.

The packaging laminate of the present invention can be filled and sealed by conventional vertical and/or horizontal automated bagging machines.

FIG. 1 illustrates a first embodiment of a packaging laminate 10 in accordance with the present invention. The packaging laminate 10 has two layers including an outside layer 12 and an inside layer 14. When the packaging laminate is used to form a food package for holding food products, the inside layer 14 is positioned next to the food product, and the outside layer 12 is the outside of the food package.

The outside layer 12 of the packaging laminate 10 is a PP copolymer film having a thickness in the range 0.4 mil-2.5 mils. The inside layer 14 of the packaging laminate 10 is a high density polyethylene (HDPE) film with a coextruded EVOH film barrier and EVOH compatibilizer (such as Dow RETAIN® EVOH compatibilizer). The inside layer 14 has a thickness in the range 1.25 mils-6.0 mils. One particularly advantageous embodiment of the packaging laminate 10, shown in FIG. 1, has an outside layer thickness of 1.35 mils and an inside layer thickness of 2.5 mils.

The properties of the packaging laminate 10, shown in FIG. 1, are set forth in Table 3 below.

TABLE 3

| Description | Units | Results | Method |
|---|---|---|---|
| Tensile at Break TD | Grams | 2500 | ASTM D882 |
| Tensile at Break MD | Grams | 4500 | ASTM 0882 |
| Elongation at Break-TD | % | 720 | ASTM 0882 |
| Elongation at Break-MD | % | 740 | ASTM 0882 |
| Elmendorf Tear (TD) | Grams | 700 | ASTM 0882 |
| Elmendorf Tear (MD) | Grams | 200 | ASTM 0882 |
| Oxygen Transmission | cc/100in2/day | 0.23 | ASTM 03985 |

With respect to the terms used in Table 3 above and Tables 4 and 5 below:
a. "Tensile at Break TD" specifies the force applied in grams in order to break the packaging laminate in its machine direction (MD).
b. "Tensile at Break MD" specifies the force applied in grams in order to break the packaging laminate in its transverse direction (TD).
c. "Elongation at Break TD" specifies the percentage of elongation of the packaging laminate at break in its TD.
d. "Elongation at Break MD" specifies the percentage of elongation of the packaging laminate at break in its MD.
   i. "Oxygen Transmission" specifies the amount of oxygen in cubic centimeters transferred through a 100 in.$^2$ area of the packaging laminate in a 24-hour period.
   ii. "Water Vapor Transmission" specifies the amount of water vapor in grams transferred through a 100 in.$^2$ area of the packaging laminate in a 24-hour period.

Figure 2:
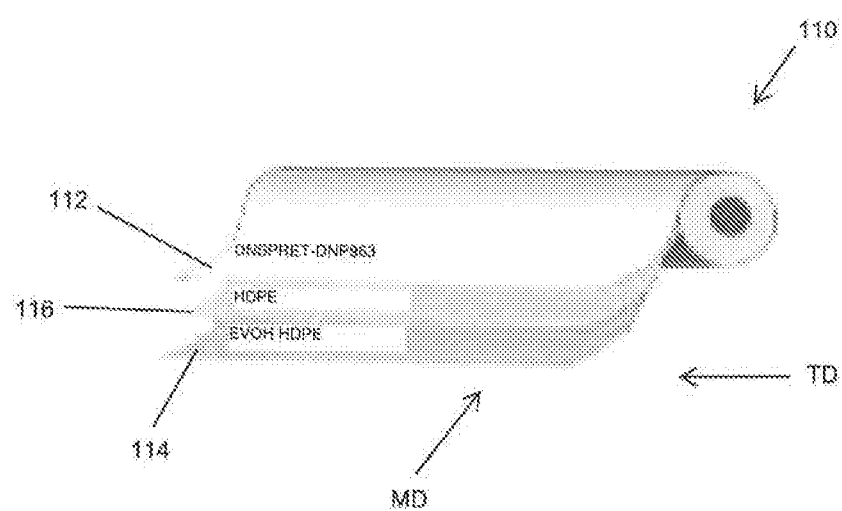
FIG. 2 is a perspective drawing of a second embodiment of a packaging laminate in accordance with the present invention.

FIG. 2 illustrates a second embodiment of a packaging laminate 110 in accordance with the present invention. The packaging laminate 110 has three layers including an outside layer 112 which is a PP copolymer film, an inside layer 114 which is an HDPE with a coextruded EVOH film barrier and EVOH compatibilizer (such as Dow RETAIN® EVOH compatibilizer), and a middle layer 116 which comprises HDPE. When the packaging laminate 110 is used to form a food package for holding food products, the inside layer 114 is positioned next to the food product, and the outside layer 112 is the outside of the food package.

The outside layer 112 of the packaging laminate 110 having a thickness in the range 0.4 mil-2.5 mils. The inside layer 114 has a thickness in the range 1.25 mils-6.0 mils. The middle layer 116 of the packaging laminate 110 is having a thickness in the range 0.8 mil-4.5 mils.

Figure 3:
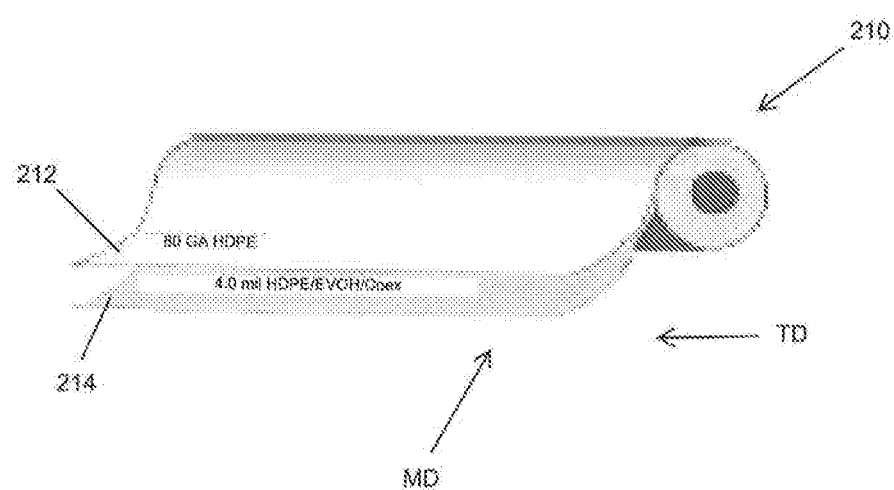
FIG. 3 is a perspective drawing of a third embodiment of a packaging laminate in accordance with the present invention.

FIG. 3 illustrates a third embodiment of a packaging laminate 210 in accordance with the present invention. The packaging laminate 210 has two layers including an outside layer 212 comprising HDPE or HDPE and Octene (for example, 80% weight HDPE and 20% weight Octene) and an inside layer 214 comprising HDPE with a coextruded EVOH film barrier and EVOH compatibilizer (such as Dow RETAIN® EVOH compatibilizer). When the packaging laminate 310 is used to form a food package for holding food products, the inside layer 214 is positioned next to the food product, and the outside layer 212 is the outside of the food package.

The outside layer 212 of the packaging laminate 210 is a HDPE or HDPE and Octne film having a thickness in the range 0.4 mil-2.5 mils. The inside layer 214 of the packaging laminate 210 is a LD/HDPE film with a coextruded EVOH film barrier. The inside layer 114 has a thickness in the range 1.25 mils-6.0 mils. One particularly advantageous embodiment, shown in FIG. 3, has an outside layer thickness of 0.80 mils and an inside layer thickness of 4.0 mils.

The properties of the packaging laminate 210, shown in FIG. 3, are set forth in Table 4 below.

TABLE 4

| Description | Units | Results | Method |
|---|---|---|---|
| C.O.F. Outside | kinetic | 0.25 | ASTM D1894 |
| C.O.F. Inside (Seal Side) | Kinetic | 0.15 | ASTM D1894 |
| Tensile at Break TD | Grams | 3500 | ASTM D882 |
| Tensile at Break MD | Grams | 3200 | ASTM 0882 |
| Elongation at Break-TD | % | 400 | ASTM 0882 |
| Elongation at Break-MD | % | 350 | ASTM 0882 |
| Oxygen Transmission | cc/100in2/day | 0.1 | ASTM 03985 |
| Water Vapor Transmission | gm/100in2/day | 0.1 | ASTM F1249 |

In Table 4 above:
e. "C.O.F. Outside" means the coefficient of friction for the outside surface of the outside layer 212 of the laminate 210.
f. "C.O.F. Inside (Seal Side)" means the coefficient of friction for the inside surface of the inside layer 214 of the laminate 210.

The outside layer 312 of the packaging laminate 310 is a PE film having a thickness in the range 0.4 mil-2.5 mils. The inside layer 314 of the packaging laminate 310 is a low density/high density polyethylene (LD/HDPE) film with a coextruded EVOH film barrier. The inside layer 314 has a thickness in the range 1.25 mils-6.0 mils. The middle layer 16 of the packaging laminate 310 is a HDPE film having a thickness in the range 0.8 mil-4.5 mils. One particularly advantageous embodiment of the packaging laminate 10, shown in FIG. 1, has an outside layer thickness of 1.25 mils, an inside layer thickness of 2.0 mils, and a middle layer thickness of 1.5 mils. In an alternative embodiment, the thickness of the inside, outside, and middle layers, can be 0.8 mils (i.e., 80 GA), 2.0 mils, and 1.5 mils, respectively.

Figure 4:
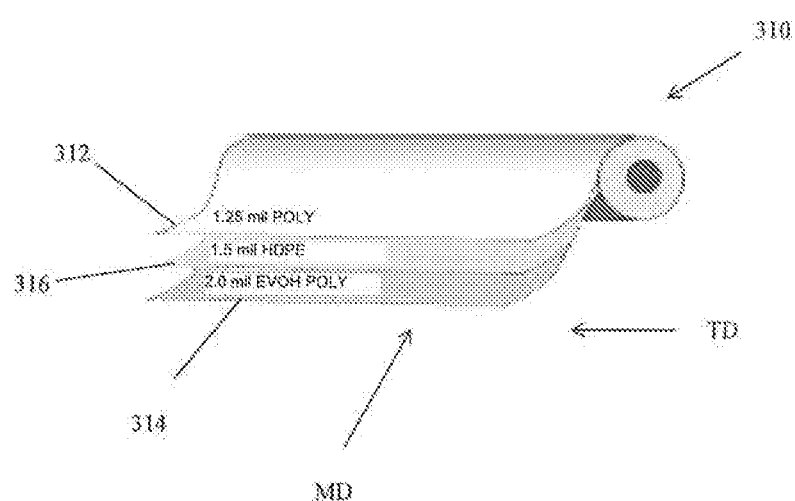
FIG. 4 is a perspective drawing of a fourth embodiment of a packaging laminate in accordance with the present invention.

The properties of the packaging laminate 310, shown in FIG. 4, are set forth in Table 5 below.

TABLE 5

| Description | Units | Results | Method |
|---|---|---|---|
| Tensile at Break TD | Grams | 4800 | ASTM D882 |
| Tensile at Break MD | Grams | 4500 | ASTM 0882 |
| Elongation at Break-TD | % | 750 | ASTM 0882 |
| Elongation at Break-MD | % | 700 | ASTM 0882 |
| Oxygen Transmission | cc/100in2/day | 0.24 | ASTM 03985 |
| Water Vapor Transmission | gm/100in2/day | 8 | ASTM F1249 |

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

What is claimed is:

1. A recyclable packaging laminate, comprising:
    a first polymeric layer formed from a first composition consisting of a high-density polyethylene (HDPE) resin, a polypropylene copolymer, ethyl vinyl alcohol (EVOH), and a compatibilizer; and
    a second polymeric layer formed from a second composition comprising HDPE, a linear low-density polyethylene (LLDPE) resin, a low-density polyethylene (LDPE) resin, or a combination thereof, and
    wherein the laminate is recyclable to the same extent as #2HDPE film or #4LLDPE film.

2. The recyclable packaging laminate of claim 1, wherein the compatibilizer is a low molecular weight plastomer.

3. The recyclable packaging laminate of claim 1, wherein the compatibilizer is an EVOH compatibilizer.

4. The recyclable packaging laminate of claim 1, wherein the compatibilizer and EVOH are present in the first composition in a 1:1 ratio.

5. The recyclable packaging laminate of claim 1, wherein the first polymeric layer has a first thickness and the second polymeric layer has a second thickness different from the first thickness.

6. The recyclable packaging laminate of claim 1, wherein the compatibilizer comprises at least about 5 percent to about 10 percent by weight of the first composition.

7. A recyclable packaging laminate, comprising:
    an outer layer formed from a first composition consisting of a high-density polyethylene (HDPE) resin, ethyl vinyl alcohol (EVOH), and a compatibilizer, and
    an inner layer formed from a second composition comprising: a resin selected from the group consisting of high-density polyethylene (HDPE), linear low-density polyethylene (LLDPE), low-density polyethylene (LDPE), and combinations thereof,
    wherein the laminate is recyclable to the same extent as #2HDPE film or #4LLDPE film.

8. The recyclable packaging laminate of claim 7, further comprising a third polymeric layer positioned between the first layer and the second layer, wherein the third polymeric layer is formed from a third composition comprising an HDPE resin.

9. The recyclable packaging laminate of claim 7, wherein the compatibilizer is an EVOH compatibilizer.

10. The recyclable packaging laminate of claim 9, wherein the EVOH compatibilizer and EVOH are present in the first composition in a 1:1 ratio.

11. The recyclable packaging laminate of claim 7, wherein the polypropylene is a polypropylene copolymer.

12. The recyclable packaging laminate of claim 1, wherein the first polymeric layer is an outer layer of the recyclable packaging laminate.

* * * * *